July 13, 1937.  F. Y. CHUCK  2,086,766
THERAPEUTIC SUBSTANCE AND PROCESS OF MANUFACTURE
Filed Dec. 5, 1933  2 Sheets-Sheet 1
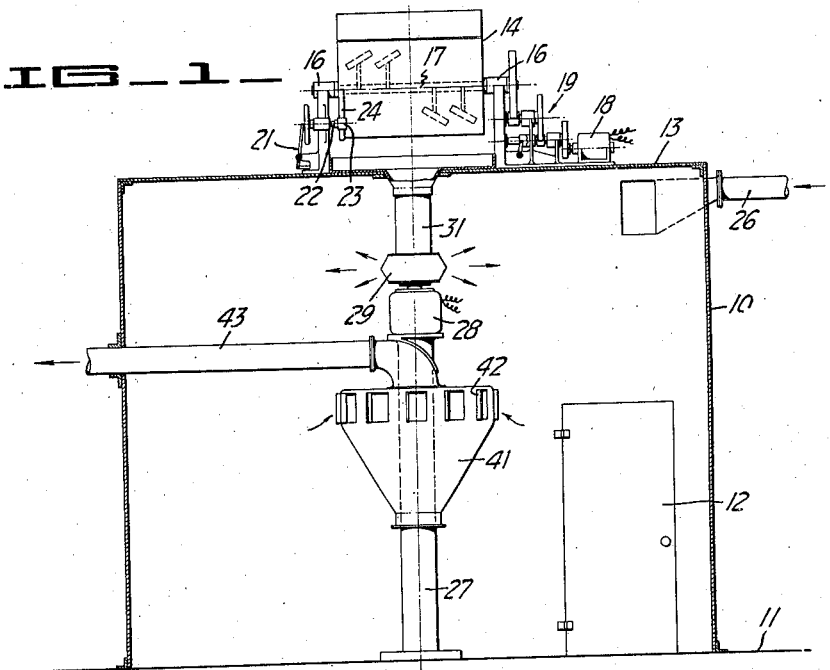
FIG_1_
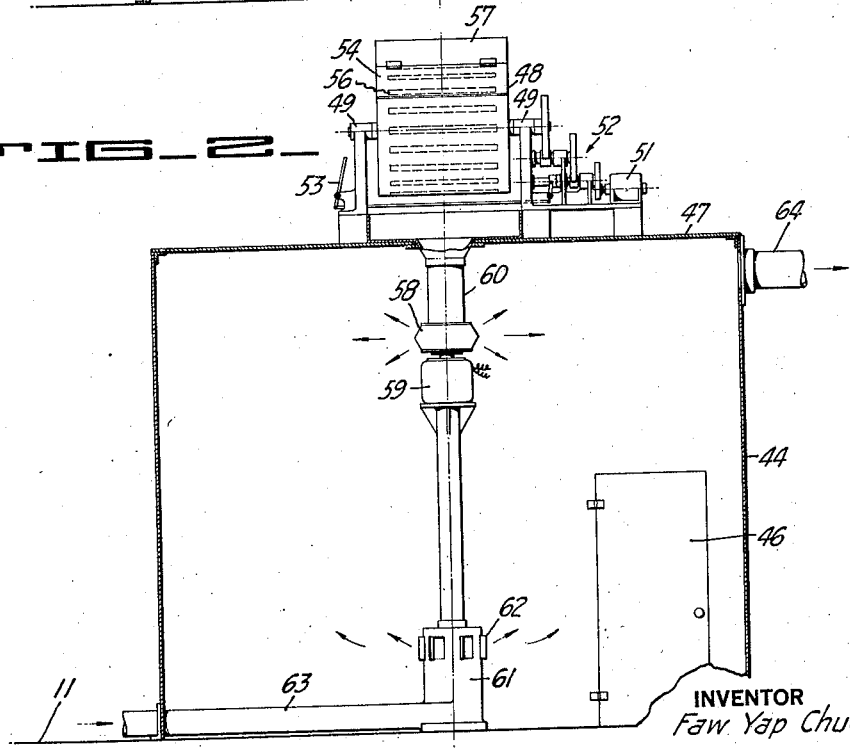
FIG_2_
INVENTOR
Faw Yap Chuck
BY
White, Prost, Flehr & Lothrop
ATTORNEYS July 13, 1937.   F. Y. CHUCK   2,086,766
THERAPEUTIC SUBSTANCE AND PROCESS OF MANUFACTURE
Filed Dec. 5, 1933   2 Sheets-Sheet 2
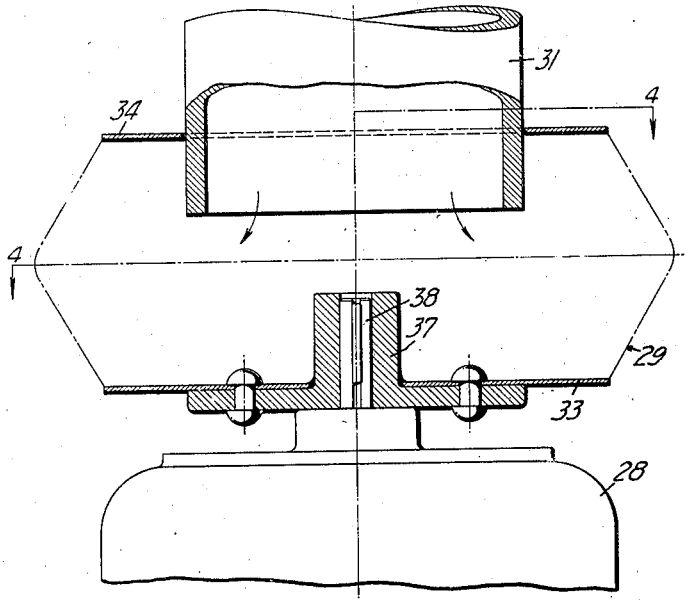
FIG_6_   FIG_3_
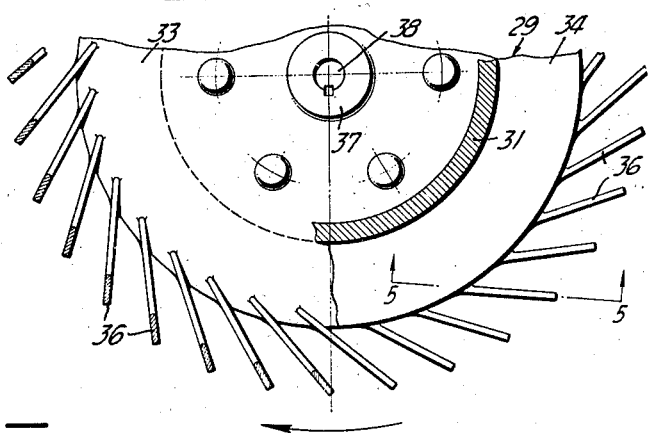
FIG_4_
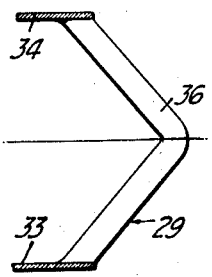
FIG_5_
INVENTOR
Faw Yap Chuck
BY
White, Prost, Hehr & Lothrop
ATTORNEYS Patented July 13, 1937

2,086,766

UNITED STATES PATENT OFFICE 2,086,766

THERAPEUTIC SUBSTANCE AND PROCESS OF MANUFACTURE

Faw Yap Chuck, San Francisco, Calif.

Application December 5, 1933, Serial No. 700,961

11 Claims. (Cl. 167—53.1)

This invention relates generally to therapeutic preparations and the processes for manufacturing the same. The preparation has been found useful as a veterinary remedy, particularly in the control of a certain avian disease commonly termed "coccidiosis".

In my co-pending application Serial Number 623,393, filed July 19, 1932, there is disclosed a therapeutic remedy which has been found particularly useful in the control of coccidiosis, and a process for its manufacture. During the course of extensive use of this material it has been found that it is not as palatable as is desired, and in certain instances it releases its active ingredients at too rapid a rate while passing through the intestinal tract, with the result that parasites peculiarly found in the lower intestines are not attacked in the manner desired. It is an object of the present invention generally to improve upon the preparation and process disclosed in this co-pending application, whereby the preparation is rendered more palatable, and whereby the active ingredients are released at a more gradual and regulated rate.

Further objects of the invention will appear from the following description in which the preferred embodiment of the invention has been set forth in detail in conjunction with the accompanying drawings.

Referring to the drawings:

Figure 1 is a side elevational view, partly in cross-section, showing a mixing and drying apparatus utilized in carrying out my process.

Figure 2 is a side elevational view, partly in cross-section, illustrating a further apparatus utilized in my process, for mixing the material with a waxy substance like hydrogenated oil, and for atomizing and chilling the material after it has been mixed.

Figure 3 is a side elevational detail, showing an atomizer which I prefer to utilize with the apparatus of Figure 1.

Figure 4 is a fragmentary cross-sectional detail taken along the line 4—4 of Figure 3.

Figure 5 is a cross-sectional detail, taken along the line 5—5 of Figure 4.

Figure 6 is a flow diagram, showing the principal steps in carrying out my process.

Before describing the apparatus illustrated in the drawings, it may be explained that my process consists in general of combining an active therapeutic compound, like an iodo-nicotine tannate-protein compound, with coagulated casein. This material, preferably after being treated to remove undesired odors, is then atomized and dried to form a powder. The powder is then mixed with a suitable waxy material such as hydrogenated vegetable oil, after which the mixture is atomized and chilled.

The apparatus of Figure 1 is for the purpose of carrying out certain of the mixing operations, and for effecting drying to form a granular material. It consists generally of a treatment chamber 10, erected upon the floor 11, and provided with a door 12 for convenient access. Mounted upon the top 13 or platform, there is a mixing apparatus consisting of a receptacle 14, carried by horizontal trunnions 16. Within the receptacle 14 there is a rotary beater or agitator 17 which is adapted to be driven by suitable means, such as an electric motor 18, through the reduction gearing 19. The drive gearing may be provided with a clutch, to be controlled by lever 21. In order to manually tilt the receptacle 14 to discharge its contents, a shaft 22 is shown provided with a pinion 23 which engages a gear rack 24 secured to the receptacle.

The upper portion of chamber 10 is in communication with an inflow conduit 26, through which a suitable drying gas, such as air at a suitable temperature, can be introduced. Mounted centrally upon the floor 11, there is a supporting column 27, upon the upper end of which is mounted a motor 28. Mounted upon the vertical shaft of this motor there is a rotary atomizer 29, which is of such a character that it will break up a coagulated mass into small particles. In order to supply material to the atomizer 29, a depending conduit 31 is shown, having its upper end opening through the top 13 and its lower open end depending into the atomizer 29.

A suitable type of atomizer 29 has been shown in detail in Figures 3 and 4. This device consists of a pair of vertically spaced annular plates 33 and 34, connected by circumferentially spaced vanes 36. Plate 33 is provided with a hub 37, which in turn is secured to the motor shaft 38. While the vanes 36 are substantially perpendicular, the plane of each vane is at an angle of substantially 45 degrees with respect to its radius of rotation. Likewise, each vane in contour is V-shaped, as shown in Figure 5. The lower end of conduit 31 extends downwardly through the upper annular plate 34, as shown in Figure 3. Assuming that this device is rotated at a relatively high speed, coagulated masses of wet material dropped down through conduit 31 are thrown outwardly by centrifugal force and are impacted with vanes 36, thus serving to subdivide the material into relatively small particles. These particles are then distributed or thrown outwardly into contact with the drying gas maintained in treatment chamber 10.

For the continual movement of gas from the interior of chamber 10, I have shown a conical-shaped exhaust box or cyclone separator 41 which can surround the supporting column 27. The upper portion of this exhaust box is provided with tangentially-directed louvers 42, and the central portion of the top of the box is in communication with the exhaust conduit 43. In operation, conduit 43 can be connected to the inflow side of a blower, so as to continually maintain swirling currents of drying air within the treatment chamber.

The apparatus shown in Figure 2, which is for the purpose of mixing the dried divided material with a waxy substance, and for hardening the waxy substance by chilling, likewise consists of a treatment chamber 44 mounted upon the floor 11 and provided with a side door 46. Mounted upon the top wall of platform 47, there is a mixing apparatus consisting of a drum 48, carried by the trunnions 49. This drum is adapted to be rotated by suitable means, such as an electric motor 51, operating through the gearing 52. A clutch interposed in the drive gearing can be controlled by lever 53. The drum is provided with a charging door 54 and with electrical heating elements 56. Likewise, a well 57 is provided, through which melted wax can be introduced intc the interior of the drum.

Located within the treatment chamber 44 there is a rotary atomizer 58, similar to the atomizer 29 of Figure 1, which is driven by an electric motor 59. Material is supplied to the atomizer 58 through conduit 60 which has its upper end opening through the top 47. Located near the central vertical axis of the chamber, and adjacent the floor 11, there is a box 61, provided with tangentially opening louvers 62. This box is connected to a conduit 63 through which a stream of cold air can be introduced. The upper portion of the treatment chamber is in communication with an exhaust conduit 64, which may lead to a cyclone separator.

My complete process in its preferred form, and the manner of utilizing the apparatus described above, can now be explained in detail as follows:—I first prepare an iodo-nicotine-tannate-protein compound, in accordance with the procedure outlined in said co-pending application Serial Number 623,393. Briefly, 50 pounds of soy bean (which is a source of protein in the form of glycinin) are soaked in water for ten hours and then ground into a thick liquid milk. This is then filtered to remove coarse particles and fibrous materials, and a certain amount of molasses may be added to flavor the final product. The homogeneous filtrate is then heated to about 195° Fahrenheit and divided into two equal portions.

To one portion of the soy bean milk is added a solution of 25 lbs. iodine in 30 lbs. 95% alcohol, while the milk is being constantly stirred. At this time glycinin, which constitutes about 85% to 95% of the protein content of the soy bean milk, combines with part of the iodine; the starch in the milk combines with another part of the iodine, and the rest of the iodine is absorbed throughout the brown colloidal precipitate which is being formed in the process.

To the other portion of the soy bean milk there is added 38 lbs. of tannic acid (95% pure). The tannic acid is added gradually and the milk continually stirred. A yellow precipitate of glycinin-tannate is formed. About 17 lbs. of 95% pure nicotine is then added with continuous stirring. A dark viscous mass of nicotine-glycinin-tannate is formed.

The iodine protein compound with absorbed iodine made from the first portion of the soy bean milk, is now mixed with the nicotine compound made from the second portion of the milk, at about 100° Fahrenheit. An additional reaction occurs to form an iodo-nicotine-tannate-protein compound, or, more specifically, a di-iodo-nicotine-glycinin-tannate. The brownish black precipitate formed, being a colloid, has no clear-cut physical characteristics, although it has been found possible to isolate therefrom a pure iodo-nicotine-tannate-protein compound.

The mass of material prepared as described above is then intermixed with a suitable filler, such as finely ground corn meal, to form a moist powdery mass. This mass is then introduced into the mixing container 14 of Figure 1, and to it is added a powdered sodium-caseinate, in suitable proportions, such as 200 lbs. of the iodo-nicotine-tannate-protein compound to 10 lbs. of sodium-caseinate. After these ingredients have been thoroughly mixed together to cause the sodium-caseinate to be absorbed, the casein is coagulated, preferably by adding hydrochloric acid while the mass is being mixed. The casein precipitates in the form of grains which mechanically retain within them the iodo-nicotine compound. As will be presently explained, the iodo-nicotine compound so retained by precipitated casein avoids the disadvantage of an objectionable taste.

After forming the casein precipitate as described above, I preferably furtner treat the material for the purpose of absorbing objectionable odors. I found that this can be accomplished by introducing into the mixer an absorbent material like charcoal, diatomaceous earth, and the like. Thus, in actual practice, from 5 to 10 lbs. of such material is added to the batch and intermixed therewith for a length of time sufficient to absorb the odors which it is desired to eliminate.

The material within the mixer is now in the form of a moist friable mass. This material is then removed from the mixer and fed downwardly through the conduit 31 of the apparatus shown in Figure 1, to be broken up into small particles by the action of the atomizer 29. While the particles settle downwardly within the treatment chamber 10, considerable moisture is evolved, and further moisture is evolved from the material resting upon the floor. The majority of the material is collected upon the floor, but a certain amount of finer material is separated out in the exhaust box 41.

The dried material produced as described above is then removed from the apparatus of Figure 1 and is introduced into the mixing drum of Figure 2, together with a suitable waxy material. Beeswax can be used for this purpose, but I prefer to employ a hydrogenated vegetable oil which will harden at ordinary temperatures, because such an oil is digestible. In practice, about 130 lbs. of the dried material is introduced into the drum 48, together with about 40 lbs. of the waxy material which has previously been melted and which is introduced through the well 57. By virtue of the electrical heating coils 56, this batch of material is maintained at a temperature of about 10 degrees above the melting point of the oil. After thoroughly mixing this batch of material, during which time the particles of the material removed from the apparatus of Figure 1 are thoroughly coated with the oil, the material is fed downwardly through conduit 60 into the atomizer 58. This atomizer breaks up the material into small particles, and while these particles are settling within the treatment chamber 44 the oil or waxy material is cooled to cause hardening of the same. The material which settles to the floor 11 of the chamber 44, and the material which may be recovered in the pneumatic separator connected to conduit 64, are now completely processed and in the form of a granular powder.

The process described above has been summarized in graphic form by the flow sheet of Figure 6.

It is evident that the product produced by the process described herein is superior to the product produced by the process of my co-pending application Serial Number 623,393. The material is highly palatable, since the casein avoids an unpleasant taste, and because objectionable odors are removed by the process. Since both the waxy material and the casein are digestible, the active ingredient carried by the material is gradually released within the intestines, with resulting destruction of various intestinal parasites, including coccidia organisms and worms. The waxy material is digestible only in the intestinal tract, thus avoiding any release of the active ingredient in the stomach. The controlled release of the active ingredient makes possible destructive action upon organisms affecting the lower intestinal tract, and also minimizes toxicity and permits the administering of larger doses.

I claim:

1. In a product of the character described, a nicotine compound mechanically entrained with coagulated casein.

2. In a product of the character described, a material in divided form including a complex compound of nicotine, iodine, protein and tannic acid entrained with coagulated casein, the particles of the material being coated with a digestible wax.

3. In a process of manufacturing a product of the character described, forming a wet mass including active therapeutic ingredients, desiccating said mass to form a powder, mixing the powder with melted wax, and then atomizing and chilling the mix.

4. In a process for the manufacture of a product of the character described, reacting nicotine with a protein containing material whereby a precipitate is formed, combining the precipitate with coagulated casein, desiccating the resulting material to form a dried powder, mixing the powder with melted wax, and then atomizing and chilling the mix.

5. In a process of manufacturing a product of the character described, forming a wet viscous mass including a complex compound of nicotine, iodine, tannic acid, and protein, desiccating said mass to form a dried powder, mixing the powder with melted wax, and then atomizing and chilling the mix.

6. In a process of manufacturing a product of the character described, mixing an iodo-nicotine-tannate-protein compound with sodium-caseinate, precipitating the casein with acid, atomizing and drying the precipitate to form a powder, mixing the powder with a melted wax, and then atomizing and chilling the mix to form a granular powder.

7. In a veterinary remedy, a granular powder comprising particles coated with a digestible wax, each of said particles comprising a compound toxic to intestinal parasites, mechanically entrained with coagulated casein.

8. In a veterinary remedy, a granular powder comprising particles coated with a digestible wax, each of said particles comprising a complex compound of nicotine, iodine, protein and tannic acid, the compound in solid form being mechanically entrained with coagulated casein.

9. In a process of the character described, forming a wet mass including a nicotine compound together with dissolved casein, coagulating the casein, desiccating the mass to form a powder, mixing the powder with melted wax, and then atomizing and chilling the mix to form a granular powder.

10. In a veterinary remedy, a divided material consisting of a complex compound of nicotine, iodine, protein and tannic acid, said compound being mechanically entrained with coagulated casein.

11. In a veterinary remedy, a divided material consisting of a complex compound of nicotine, iodine, protein and tannic acid, the particles of said material being coated with a digestible wax.

FAW YAP CHUCK.